US012423966B2

(12) United States Patent
Lee et al.

(10) Patent No.: US 12,423,966 B2
(45) Date of Patent: Sep. 23, 2025

(54) DEEP NEURAL NETWORK-BASED REAL-TIME INFERENCE METHOD, AND CLOUD DEVICE AND EDGE DEVICE PERFORMING DEEP NEURAL NETWORK-BASED REAL-TIME INFERENCE METHOD

(71) Applicant: Research & Business Foundation SUNGKYUNKWAN UNIVERSITY, Suwon-si (KR)

(72) Inventors: Joo Chan Lee, Suwon-si (KR); Jong Hwan Ko, Suwon-si (KR)

(73) Assignee: Research & Business Foundation SUNGKYUNKWAN UNIVERSITY, Suwon-si (KR)

( * ) Notice: Subject to any disclaimer, the term of this patent is extended or adjusted under 35 U.S.C. 154(b) by 295 days.

(21) Appl. No.: 18/203,695

(22) Filed: May 31, 2023

(65) Prior Publication Data

US 2023/0386192 A1    Nov. 30, 2023

(30) Foreign Application Priority Data

May 31, 2022   (KR) ........................ 10-2022-0066704

(51) Int. Cl.
*G06V 10/82*      (2022.01)
*G06V 10/28*      (2022.01)

(52) U.S. Cl.
CPC .............. *G06V 10/82* (2022.01); *G06V 10/28* (2022.01); *G06V 2201/07* (2022.01)

(58) Field of Classification Search
CPC .... G06V 10/82; G06V 10/28; G06V 2201/07; G06V 10/95; G06N 3/045; G06N 3/08; G06N 5/04
USPC ........................................................ 382/156
See application file for complete search history.

(56) References Cited

U.S. PATENT DOCUMENTS

2021/0035330 A1*   2/2021   Xie .......................... G06N 5/04

FOREIGN PATENT DOCUMENTS

| KR | 10-2019-0087264 A | 7/2019 |
| KR | 10-2019-0093204 A | 8/2019 |
| KR | 10-2020-0113744 A | 10/2020 |
| KR | 10-2021-0062346 A | 5/2021 |

OTHER PUBLICATIONS

Request for the Submission of an Opinion for Korean Patent Application No. 10-2022-0066704, dated Jun. 29, 2025.

* cited by examiner

*Primary Examiner* — Stephen P Coleman

(57) ABSTRACT

The present disclosure relates to a deep neural network-based real-time inference apparatus, system, and method, and more particularly, to a deep neural network-based real-time inference apparatus, system, and method capable of accelerating image inference.

19 Claims, 6 Drawing Sheets

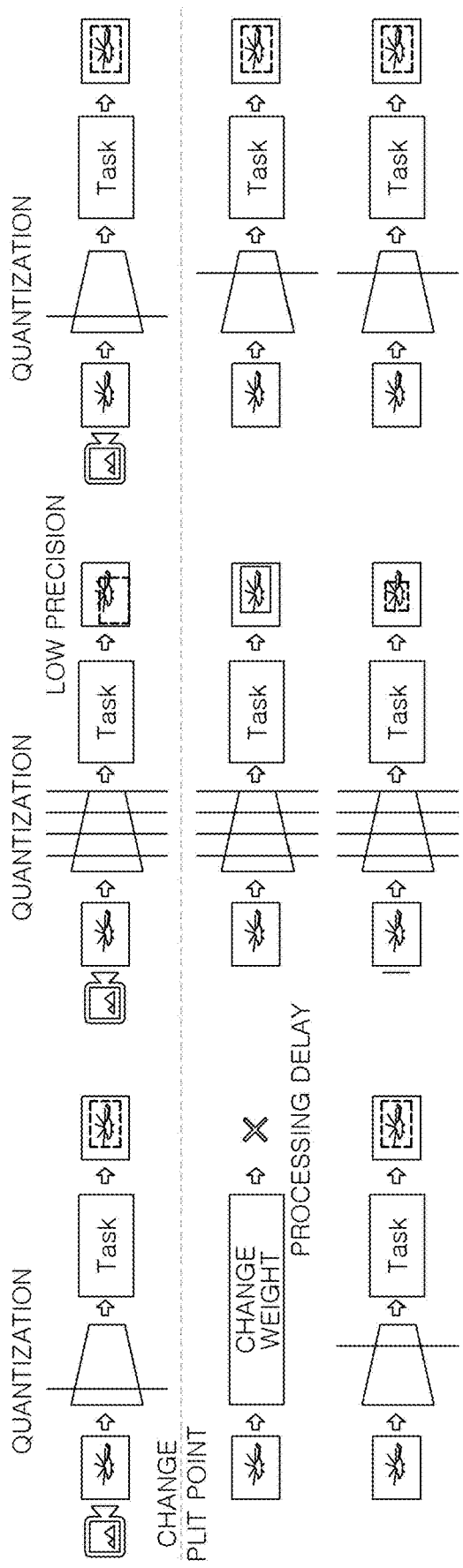

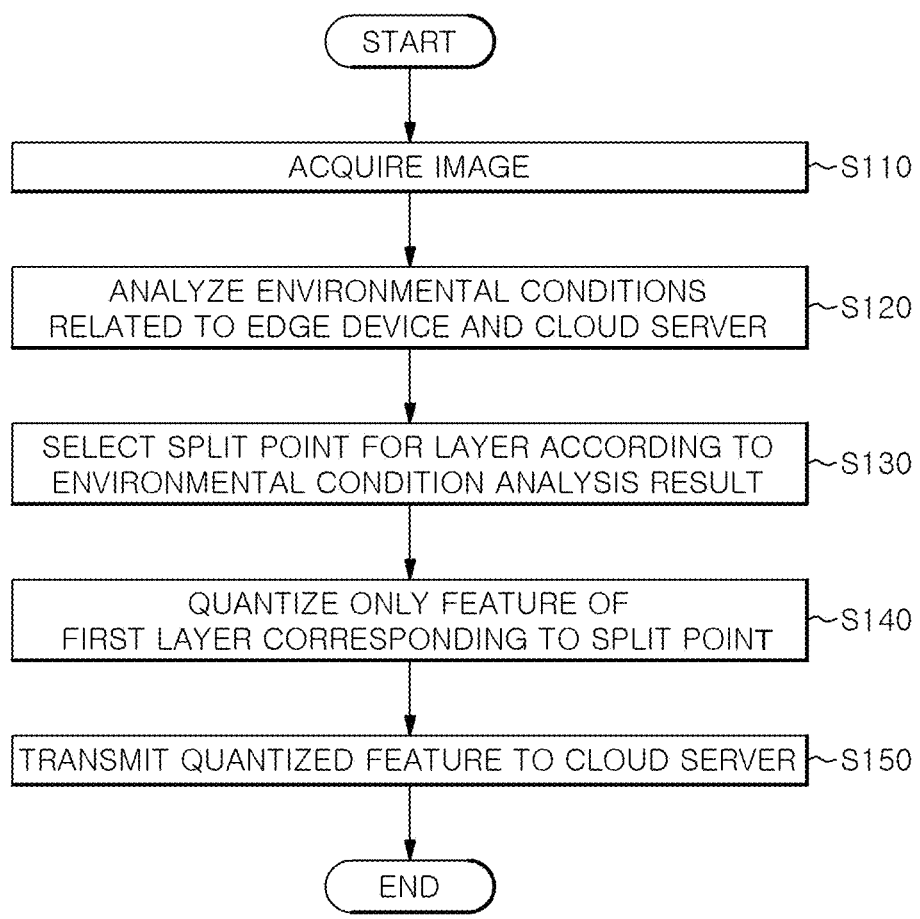

DEEP NEURAL NETWORK-BASED REAL-TIME INFERENCE METHOD, AND CLOUD DEVICE AND EDGE DEVICE PERFORMING DEEP NEURAL NETWORK-BASED REAL-TIME INFERENCE METHOD

TECHNICAL FIELD

The present disclosure relates to a deep neural network-based real-time inference apparatus, system, and method, and more particularly, to a deep neural network-based real-time inference apparatus, system, and method capable of accelerating image inference.

This work was supported by Institute of Information & communications Technology Planning & Evaluation (IITP) grant funded by Korea government (MSIT) ([Project unique No.: 1711126132; Project No.: 2019-0-00421-003; R&D project: Information Communication Broadcasting Innovative Talent Development Project; and Research Project Title: Artificial Intelligence Graduate School Program], [Project unique No.: 1711126102; Project No.: 2020-R&D project: Information Communication Broadcasting Innovative Talent Development Project; and Research Project Title: Information & Communications Technology Research and Education Project], [Project unique No.: 1711139517; Project No.: 2021-0-02068-001; R&D project: Information Communication Broadcasting Innovative Talent Development Project; and Research Project Title: Development for Artificial Intelligence Innovative Hub], and [Project unique No.: 1711139247; Project No.: 2021-0-02052-001; R&D project: Information Communication Broadcasting Innovative Talent Development Project; and Research Project Title: Development for Artificial Intelligence System on a Chip for Smart Mobility]).

BACKGROUND

With the recent development of deep neural networks (DNNs), excellent performance has been implemented in various tasks related to computer vision.

However, due to resource constraints, it is still difficult for edge devices to acquire images in real time and perform real-time inference of DNN models with complex deep neural networks. In such a case, images obtained by edge devices can be transmitted to a cloud server equipped with a high-performance GPU for processing. However, due to the characteristics of edge devices that need to use a wireless network, it may take a long time to transmit images. In order to solve this problem, it is possible to use an edge-cloud server split inference technique in which an edge device uses a part of a deep neural network and transmits a feature smaller than the original image to the cloud server for processing.

In order to further reduce the amount of transmission in edge-cloud server partitioning inference situations, transmission features can be quantized to low bits. When a model is trained by loading a low-bit quantization module on a specific layer, in particular, the model can operate normally only when splitting is performed in the layer during inference.

However, since the optimal split point varies depending on various conditions in split inference environments, there is a problem that the system needs to construct an independent model for each split point.

SUMMARY

Accordingly, an object of the present disclosure proposed to solve the above problems is to provide a deep neural network-based real-time inference apparatus, system, and method capable of accelerating image inference.

Objects of the present disclosure are not limited to those mentioned above, and other objects not mentioned above will be clearly understood by those skilled in the art from the description below.

In accordance with an aspect of the present disclosure, there is provided a deep neural network-based real-time inference apparatus including a cloud server configured to infer an acquired image along with an edge device in a split manner, the apparatus may comprise: a memory configured to store information of a second artificial intelligence model identical to a first artificial intelligence model of the edge device; and a processor executing one or more instructions stored in the memory, wherein the instructions, when executed by the processor, cause the processor to receive a quantized feature of an output of a first layer corresponding to a predetermined split point among a plurality of layers included in the first artificial intelligence model, and determine a processing result for the image based on the second artificial intelligence model by inputting the quantized feature to a second layer of the second artificial intelligence model corresponding a layer immediately after the first layer.

The cloud server may determine an object in the image by inputting the quantized feature to the artificial intelligence model.

The first artificial intelligence model and the second artificial intelligence model may include a deep neural network trained both with quantized and non-quantized features for each predetermined split layer.

The processor may be configured to analyze at least one of a network resource between the edge device and the cloud server, a computing resource of the edge device, and a computing resource of the cloud server, and determine a location of the split point with respect to the first layer based on an analysis result.

The first artificial intelligence model and the second artificial intelligence model may include a quantization switch for switching between a path for quantizing a feature of each layer and a path for passing the feature of each layer without being quantized, wherein the quantization switch may be provided for each layer of the artificial intelligence models.

The first artificial intelligence model and the second artificial intelligence model may dynamically apply a feature distribution matching unit that normalizes a distribution of features output from the first layer immediately after the split point through mean and variance.

The feature distribution matching unit may apply a convolution layer for restoring feature precision to the quantized feature.

In accordance with another aspect of the present disclosure, there is provided a deep neural network-based real-time inference apparatus including an edge device configured to transmit a quantized feature obtained by processing an acquired image to a cloud server, the apparatus may comprise: a memory configured to store information of a first artificial intelligence model identical to a second artificial intelligence model of the cloud server; and a processor executing one or more instructions stored in the memory, wherein the instructions, when executed by the processor, cause the processor to analyze at least one of resources, select a first layer corresponding to a predetermined split point from among a plurality of layers included in the first artificial intelligence model according to the at least one of resources, quantize only a feature of the first layer, and transmit the quantized feature to the cloud server.

The cloud server may determine a processing result for the image based on the second artificial intelligence model by inputting the quantized feature to a second layer of the second artificial intelligence model corresponding to a layer immediately after the first layer.

The first artificial intelligence model and the second artificial intelligence model may include a deep neural network trained both with quantized and non-quantized features for each predetermined split layer.

At least one of resources may include a network resource between the edge device and the cloud server, a computing resource of the edge device, and a computing resource of the cloud server.

The first artificial intelligence model and the second artificial intelligence model may include a quantization switch for switching between a path for quantizing a feature of each layer and a path for passing the feature of each layer without being quantized, wherein the quantization switch may be provided for each layer of the artificial intelligence models.

The first artificial intelligence model and the second artificial intelligence model may dynamically apply a feature distribution matching unit that normalizes a distribution of features output from the first layer immediately after the split point through mean and variance.

In accordance with another aspect of the present disclosure, there is provided a deep neural network based real time inference method, the method may comprise: acquiring, by a processor included in a cloud server, an image from an edge device; analyzing, by a processor included in the edge device, at least one of resources related to the edge device and a cloud server; selecting, by the processor included in the edge device, a first layer corresponding to a split point from among a plurality of layers included in a pre-trained first artificial intelligence model of the edge device according to the at least one of resources; quantizing, by the processor included in the edge device, only a feature of the first layer corresponding to the split point; transmitting, by the processor included in the edge device, the quantized feature to the cloud server; inputting, by the processor included in the cloud server, the quantized feature to a second layer corresponding to a layer immediately after the first layer among a plurality of layers included in a second artificial intelligence model identical to the first artificial intelligence model; and determining, by the processor included in the cloud server, a processing result for the image based on the second artificial intelligence model.

At least one of resources may include a network resource between the edge device and the cloud server, a computing resource of the edge device, and a computing resource of the cloud server.

The first artificial intelligence model and the second artificial intelligence model may include a quantization switch for switching between a path for quantizing a feature of each layer and a path for passing the feature of each layer without being quantized, wherein the quantization switch may be provided for each layer of the artificial intelligence models.

The first artificial intelligence model and the second artificial intelligence model may dynamically apply a feature distribution matching unit that normalizes a distribution of features output from the first layer immediately after the split point through mean and variance.

The feature distribution matching unit may apply a convolution layer for restoring feature precision to the quantized feature.

The first artificial intelligence model and the second artificial intelligence model may include a deep neural network trained both with quantized and non-quantized features for each predetermined split layer.

According to the deep neural network-based real-time inference apparatus, system, and method according to embodiments of the present disclosure, image inference can be accelerated.

Effects of the present disclosure are not limited to those mentioned above, and other effects not mentioned will be clearly understood by those skilled in the art from the description below.

BRIEF DESCRIPTION OF THE DRAWINGS

FIGS. 4A to 4C are conceptual diagrams for describing differences between a prior art and an embodiment of the present disclosure.

FIG. 6 is a flowchart illustrating a deep neural network-based real-time inference method according to an embodiment of the present disclosure.

DETAILED DESCRIPTION

Figure 1:
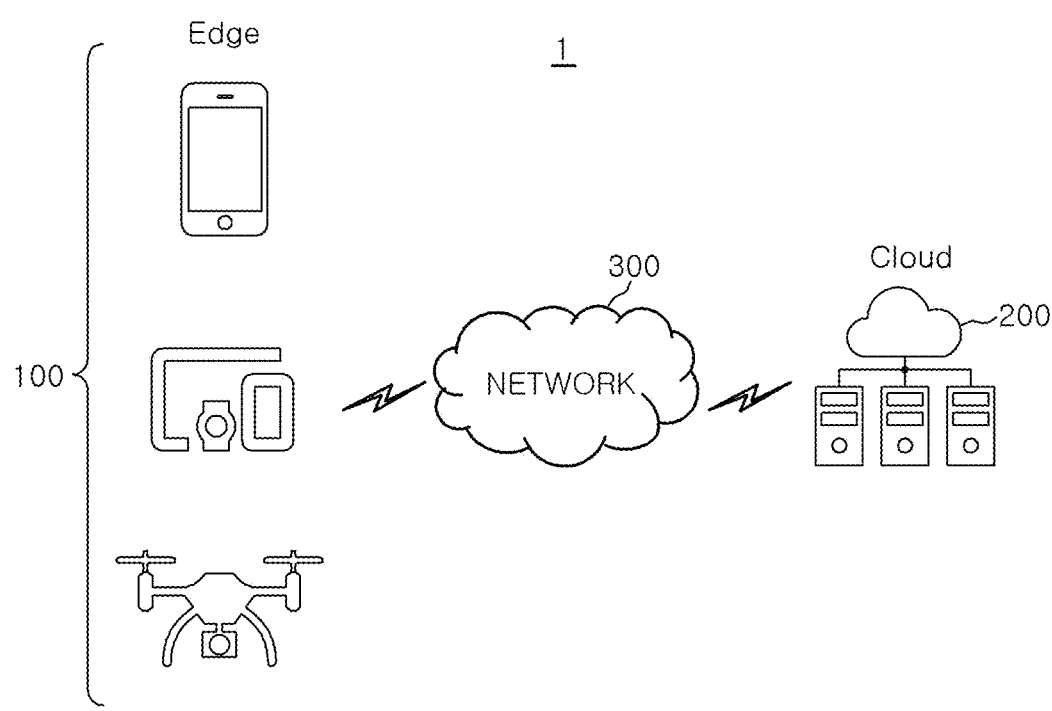
FIG. 1 is a block diagram showing a configuration of a deep neural network-based real-time inference system according to an embodiment of the present disclosure.

The advantages and features of the embodiments and the methods of accomplishing the embodiments will be clearly understood from the following description taken in conjunction with the accompanying drawings. However, embodiments are not limited to those embodiments described, as embodiments may be implemented in various forms. It should be noted that the present embodiments are provided to make a full disclosure and also to allow those skilled in the art to know the full range of the embodiments. Therefore, the embodiments are to be defined only by the scope of the appended claims.

Terms used in the present specification will be briefly described, and the present disclosure will be described in detail.

In terms used in the present disclosure, general terms currently as widely used as possible while considering functions in the present disclosure are used. However, the terms may vary according to the intention or precedent of a technician working in the field, the emergence of new technologies, and the like. In addition, in certain cases, there are terms arbitrarily selected by the applicant, and in this case, the meaning of the terms will be described in detail in the description of the corresponding invention. Therefore, the terms used in the present disclosure should be defined based on the meaning of the terms and the overall contents of the present disclosure, not just the name of the terms.

When it is described that a part in the overall specification "includes" a certain component, this means that other components may be further included instead of excluding other components unless specifically stated to the contrary.

In addition, a term such as a "unit" or a "portion" used in the specification means a software component or a hardware component such as FPGA or ASIC, and the "unit" or the "portion" performs a certain role. However, the "unit" or the "portion" is not limited to software or hardware. The "portion" or the "unit" may be configured to be in an addressable storage medium, or may be configured to reproduce one or more processors. Thus, as an example, the "unit" or the "portion" includes components (such as software components, object-oriented software components, class components, and task components), processes, functions, properties, procedures, subroutines, segments of program code, drivers, firmware, microcode, circuits, data, database, data structures, tables, arrays, and variables. The functions provided in the components and "unit" may be combined into a smaller number of components and "units" or may be further divided into additional components and "units".

Hereinafter, the embodiment of the present disclosure will be described in detail with reference to the accompanying drawings so that those of ordinary skill in the art may easily implement the present disclosure. In the drawings, portions not related to the description are omitted in order to clearly describe the present disclosure.

Figure 2:
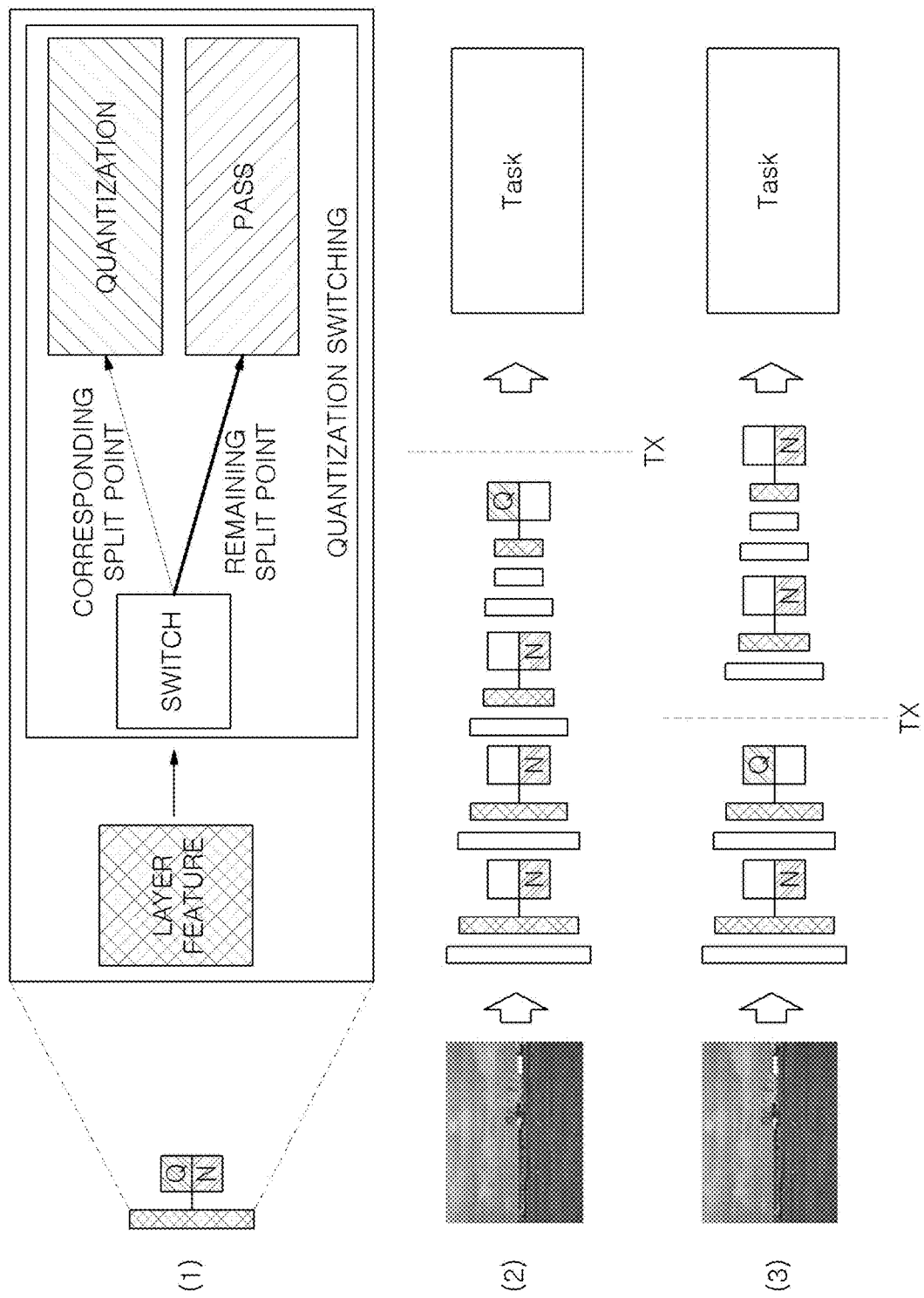
FIG. 2 is a conceptual diagram for describing operation of the deep neural network-based real-time inference system according to an embodiment of the present disclosure.

FIG. 1 is a block diagram showing a configuration of a deep neural network-based real-time inference system according to an embodiment of the present disclosure, and FIG. 2 is a conceptual diagram for describing operation of the deep neural network-based real-time inference system according to an embodiment of the present disclosure.

Referring to FIG. 1, the deep neural network-based real-time inference system 1 according to an embodiment of the present disclosure includes at least one edge devices 100 that executes edge computing, and a cloud server 200 that receives data from the edge device 100, executes cloud server computing, and transmits execution results to the edge.

For example, the edge device 100 may correspond to a smart device, a drone, or a wearable device, but is not limited thereto.

The edge device 100 may include a camera that acquires images, a memory that stores information on a pre-trained extractor, and a processor that controls components of the edge device 100.

Basically, the edge device 100 may collect data, refine data, perform preprocessing such as sampling, cleaning, and combining on data, and transmit preprocessing results to the cloud server 200.

The function of the edge device 100 can be designed in various ways. For example, the edge device 100 may be designed to process data by itself without sending the data to the cloud server 200. However, the present disclosure focuses on an embodiment in which the edge device 100 and the cloud server 200 perform data processing in a split manner.

In one embodiment, the edge device 100 may analyze environmental conditions and select a first layer corresponding to a predetermined split point from among a plurality of layers included in a first artificial intelligence model according to results of analysis of the environmental conditions.

Accordingly, the edge device 100 may reduce transmission overhead by quantizing only a feature of the first layer to decrease the bits of an intermediate feature and transmitting the quantized feature to the cloud server 200.

Here, the edge device 100 may include the pre-trained first artificial intelligence model, and the first artificial intelligence model may include a plurality of layers. Here, the first artificial intelligence model may be a deep neural network trained both with quantized and non-quantized features for each predetermined split layer.

Here, the environmental conditions may include a network speed between the edge device 100 and the cloud server 200 and at least one of the performances of the edge device 100 and the cloud server 200.

For example, the edge device 100 may select a split point in a relatively previous layer of the first artificial intelligence model if the performance of the edge device 100 does not meet preset criteria, and the edge device 100 may select a split point in a relatively later layer of the first artificial intelligence model if the performance of the edge device 100 is higher than the preset criteria.

As a component for selecting a split point, the first artificial intelligence model may further include a quantization switch 110 that switches between a path for quantizing a feature of each layer and a path for passing the feature of each layer without quantization of the feature, as shown in (1) of FIG. 2. The quantization switch 110 may be applied to each layer of the first artificial intelligence model.

(2) of FIG. 2 shows an example in which the last layer is determined as a split point, and the edge device 100 quantizes the highest level feature by selecting the last layer of the first artificial intelligence model as a split point and transmits the quantized feature to the cloud server 200. That is, (2) of FIG. 2 illustrates a case where features are output without being quantized in previous layers of the first artificial intelligence model, and the feature is output after being quantized by the switch 110 in the last layer.

(3) of FIG. 2 illustrates a case where the edge device 100 selects a relatively previous layer compared to the case of (1) as a split point, quantizes a low-level feature, and transmits the quantized feature to the cloud server 200.

Figure 3:
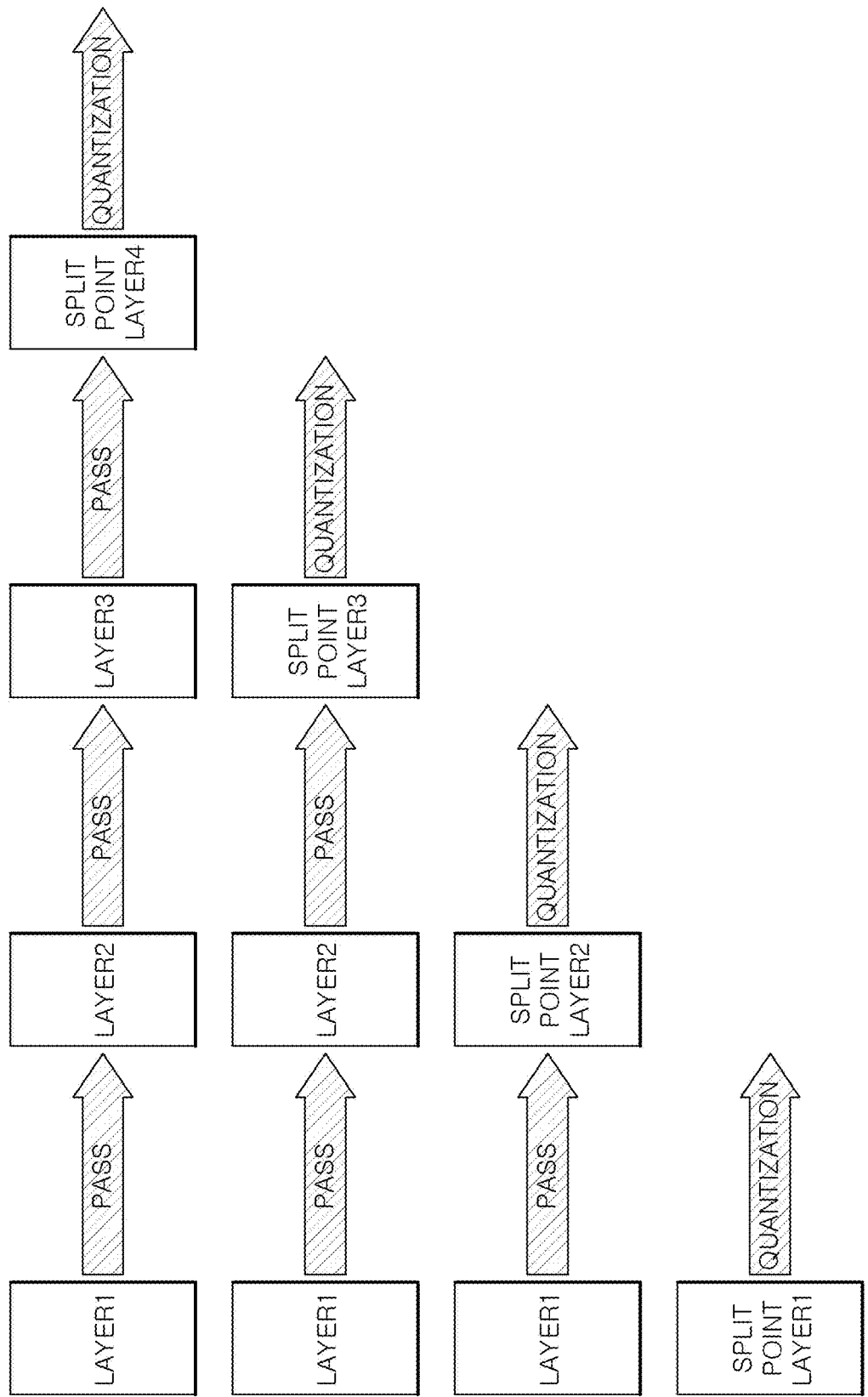
FIG. 3 is a diagram schematically illustrating an example of quantizing a feature for a layer corresponding to each split point according to an embodiment of the present disclosure.

FIG. 3 is a diagram schematically illustrating an example of quantizing a feature for a layer corresponding to each split point according to an embodiment of the present disclosure. Referring to FIG. 3, the edge device 100 does not quantize features of layers by the quantization switch 110 until reaching a layer corresponding to a split point, sequentially inputs outputs of previous layers to next layers, and upon reaching the layer corresponding to the split point, performs quantization on the feature of the corresponding layer through the quantization switch 110.

The cloud server 200 may perform core processing, such as comprehensively performing tasks received from the edge device 100 or distributing some tasks to a specific edge device 100.

Results processed in the cloud server 200 may be transmitted to the edge device 100.

In an embodiment, the cloud server 200 may derive a processing result for an image based on quantized features received from the edge device 100. For example, if a second artificial intelligence model included in the cloud server 200 is an object detection model, object detection in an image may be derived as an image processing result.

To this end, the cloud server 200 may include the pre-trained second artificial intelligence model, a memory for storing information on the second artificial intelligence model, and a processor for controlling components of the cloud server 200. Here, the second artificial intelligence model has the same structure and function as the first artificial intelligence model included in the edge device 100.

The cloud server 200 may receive a feature quantized for an output of a first layer corresponding to a predetermined split point among the plurality of layers included in the first artificial intelligence model from the edge device 100. Subsequently, the cloud server 200 may input the quantized feature to a second layer of the second artificial intelligence model corresponding to a layer immediately following the first layer in the second artificial intelligence model.

Here, the cloud server 200 can ascertain which layer corresponds to the quantized layer based on the shape of the quantized feature. To this end, the cloud server 200 may pre-store feature shape information of predetermined split points along with layer order information.

Alternatively, the edge device 100 may transmit information on the order of the first layer to the cloud server 200 such that the cloud server 200 can determine a layer to which the quantized feature will be input.

Accordingly, the cloud server 200 may derive image processing results through execution of the second to last layers of the second artificial intelligence model.

FIGS. 4A to 4C are conceptual diagrams for describing differences between a prior art and an embodiment of the present disclosure.

Referring to FIG. 4A, a model in which a split point is set is illustrated as a prior art. When a split point is fixedly set for a certain layer of an artificial intelligence model, a model needs to be provided for each split point, and models need to be switched according to a determined split point. In such a case, a storage space is required depending on the number of split options, and weight reloading overhead occurs in order to execute and switch multiple independent models. This causes a considerable delay time in the edge device 100 with limited resources.

FIG. 4B illustrates a case in which quantization modules are inserted at all split points. However, in this case, when quantization is applied to all split layers, propagated features repeatedly lose representation thereof while passing through the layers, resulting in significant decrease in accuracy.

In order to solve this problem, an embodiment of the present disclosure proposes a quantization switching method of quantizing only a feature of a layer corresponding to a selected split point for an artificial intelligence model trained for quantized and non-quantized features for each layer in the deep neural network-based split inference system according to an embodiment of the present disclosure shown in FIG. 4C.

Quantization switching supports multiple inference paths for various split points in a one-to-one correspondence, in which all paths share all layers of a model, but quantization is executed only at a corresponding split point in each path. Since every inference path allows quantization only once in a corresponding split layer, models can avoid repetitive information loss.

Figure 5A:
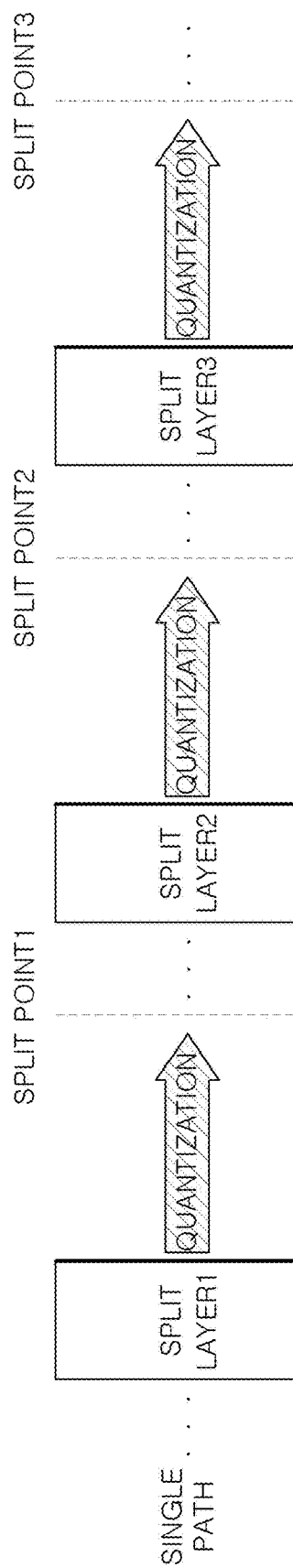
FIGS. 5A and 5B are conceptual diagrams for describing differences between a prior art and an embodiment of the present disclosure.
Figure 5B:
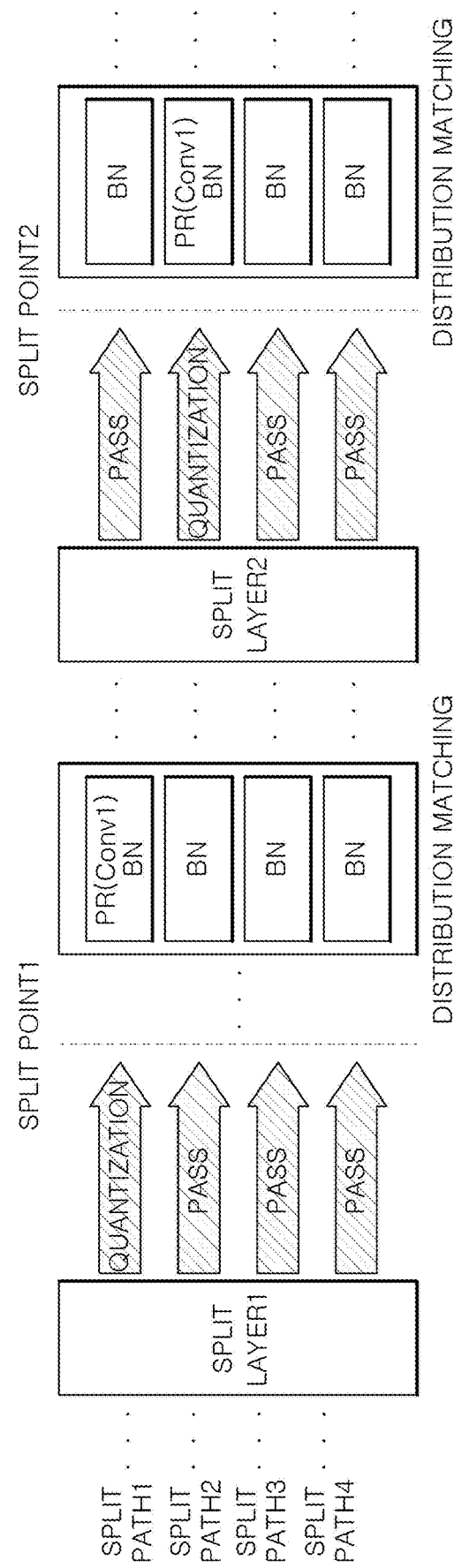

FIGS. 5A and 5B are conceptual diagrams for describing differences between a prior art and an embodiment of the present disclosure.

FIG. 5A illustrates a concept of performing quantization at all split points.

FIG. 5B illustrates a concept of performing multi-path inference according to a selected split point by applying quantization switching to a single weight model trained for quantized and non-quantized features for each layer, as described above. Since all paths share convolutional and batch normalization layers, features of different paths are expected to show a consistent distribution in each layer of the model.

However, when quantization switching is applied, an imbalance occurs in the distribution at all split points. That is, an imbalance occurs between quantized and non-quantized features obtained from different paths. This imbalance prevents convergence of optimal weights of the model.

Therefore, in order to solve this problem, in an embodiment of the present disclosure, precision restoration is performed for every split point (i.e., feature precision is restored through a precision restoration (PR) layer), and batch normalization is performed (i.e., the distribution of each path is individually normalized through a batch normalization (BN) layer).

For example, in the case of split path 1, since quantization is performed at split point 1, precision restoration (PR) is applied immediately after split layer 1, and batch normalization is performed. On the other hand, in the case of split paths 2, 3, and 4, quantization is not performed at split point 1, and thus only individual batch normalizations are performed on split paths 2, 3, and 4 after split layer 1.

In this manner, feature imbalance between split paths can be resolved at all split points.

In an embodiment, the first artificial intelligence model may dynamically apply a feature distribution matching unit that normalizes the distribution of features output from the first layer immediately after a split point through mean and variance.

In an embodiment, the feature distribution matching unit may apply a convolution layer for restoring feature precision to quantized features.

Specifically, the batch normalization is independently applied to each of split paths each of at split points. Here, even if normalization is applied to quantized features, the bit precision of the features remains low. Therefore, in order to maximize the effect of normalization applied to quantized features, feature precision is restored through a convolution layer (PR layer).

The PR layer allows the feature of a split point to represent high precision in a normal distribution, and thus models are trained more stably.

Meanwhile, the deep neural network-based real-time inference system according to an embodiment of the present disclosure aims to optimize the average accuracy in response to application of all quantization switches. Therefore, in an embodiment of the present disclosure, training is performed by summing losses of all split paths. At each iteration, gradients of all paths are computed and accumulated, and then weights of the model are updated. The number of paths is determined by a path option, which is a predefined hyperparameter. Since neural network operations in the cloud server 200 are much faster than those in the edge device 100, it is efficient to execute more layers in the cloud server 200 if the cloud server 200 and the edge device 100 have the amount of transmission.

Accordingly, the path option may be defined as a set of first layers among layers having the same feature size.

For training, a model with a precision restoration layer (PR layer) and independent batch normalization (BN) is loaded for all split paths. At the time of performing propagation and backpropagation for gradient calculation, a quantization module and the restoration layer are activated only in a layer corresponding to a selected split point, and independent batch normalization (BN) of all split layers is switched according to a selected path.

FIG. 6 is a flowchart illustrating a deep neural network-based real-time inference method according to an embodiment of the present disclosure.

The deep neural network-based real-time inference method according to an embodiment of the present disclosure may be performed in substantially the same components as those of the system 1 of FIG. 1. Accordingly, the same components as those of the system 1 of FIG. 1 are denoted by the same reference numerals and redundant descriptions are omitted.

Referring to FIG. 6, in the deep neural network-based real-time inference method according to an embodiment of the present disclosure, when an edge device acquires an image (S110), the edge device analyzes environmental conditions related to the edge device and a cloud server (S120), and selects a first layer corresponding to a split point from among a plurality of layers included in a pre-trained first artificial intelligence model of the edge device according to a result of analysis of the environmental conditions (S130). The edge device quantizes only the feature of the first layer corresponding to the split point (S140) and transmits the quantized feature to the cloud server (S150).

Here, the environmental conditions may include a network speed between the edge device and the cloud server and at least one of the performances of the edge device and the cloud server.

For example, if the performance of the edge device does not meet preset criteria, the edge device may select a split point in a relatively previous layer of the first artificial intelligence model, and if the performance of the edge device is higher than the preset criteria, the edge device may select a split point in a relatively later layer of the first artificial intelligence model.

As a component for selecting a split point, the first artificial intelligence model may further include a quantization switch that switches between a path for quantizing a feature of each layer and a path for passing the feature of each layer without being quantized, as shown in (1) of FIG. 2. The quantization switch may be applied to each layer of the first artificial intelligence model.

Next, when the cloud server inputs the quantized feature to a second layer immediately after the first layer among a plurality of layers included in a second artificial intelligence model identical to the first artificial intelligence model, the cloud server may derive an image processing result based on the second artificial intelligence model.

For example, when the second artificial intelligence model included in the cloud server is an object detection model, object detection in an image may be derived as an image processing result.

Specifically, the cloud server may receive a quantized feature of an output of the first layer corresponding to a predetermined split point among the plurality of layers included in the first artificial intelligence model from the edge device. Subsequently, the cloud server may input the quantized feature to the second layer of the second artificial intelligence model which corresponds to a layer immediately after the first layer.

Here, the cloud server can ascertain which layer corresponds to the quantized layer based on the shape of the quantized feature. To this end, the cloud server 200 may pre-store feature shape information of predetermined split points along with layer order information.

Alternatively, the edge device may transmit information on the order of the first layer to the cloud server such that the cloud server can determine a layer to which the quantized feature will be input.

The above-described deep neural network-based real-time inference system may be implemented by a computing device including at least some of a processor, a memory, a user input device, and a presentation device.

The memory is a medium that stores computer-readable software, applications, program modules, routines, instructions, and/or data coded to perform a specific task when executed by the processor. The processor may read and execute the computer-readable software, applications, program modules, routines, instructions, and/or data stored in the memory.

The computing device may include various devices such as smartphones, tablets, laptops, desktops, servers, and clients. The computing device may be a single stand-alone device or may include multiple computing devices operating in a distributed environment consisting of multiple computing devices cooperating with each other over a communications network.

In addition, the above-described deep neural network-based real-time inference method may be performed by a computing device including a processor and a memory storing computer-readable software, applications, program modules, routines, instructions, and/or data structures coded to perform an object detection method using an artificial intelligence model when executed by the processor.

Combinations of steps in each flowchart attached to the present disclosure may be executed by computer program instructions. Since the computer program instructions can be mounted on a processor of a general-purpose computer, a special purpose computer, or other programmable data processing equipment, the instructions executed by the processor of the computer or other programmable data processing equipment create a means for performing the functions described in each step of the flowchart. The computer program instructions can also be stored on a computer-usable or computer-readable storage medium which can be directed to a computer or other programmable data processing equipment to implement a function in a specific manner. Accordingly, the instructions stored on the computer-usable or computer-readable recording medium can also produce an article of manufacture containing an instruction means which performs the functions described in each step of the flowchart. The computer program instructions can also be mounted on a computer or other programmable data processing equipment. Accordingly, a series of operational steps are performed on a computer or other programmable data processing equipment to create a computer-executable process, and it is also possible for instructions to perform a computer or other programmable data processing equipment to provide steps for performing the functions described in each step of the flowchart.

In addition, each step may represent a module, a segment, or a portion of codes which contains one or more executable instructions for executing the specified logical function(s). It should also be noted that in some alternative embodiments, the functions mentioned in the steps may occur out of order. For example, two steps illustrated in succession may in fact be performed substantially simultaneously, or the steps may sometimes be performed in a reverse order depending on the corresponding function.

The above description is merely exemplary description of the technical scope of the present disclosure, and it will be understood by those skilled in the art that various changes and modifications can be made without departing from original characteristics of the present disclosure. Therefore, the embodiments disclosed in the present disclosure are intended to explain, not to limit, the technical scope of the present disclosure, and the technical scope of the present disclosure is not limited by the embodiments. The protection scope of the present disclosure should be interpreted based on the following claims and it should be appreciated that all technical scopes included within a range equivalent thereto are included in the protection scope of the present disclosure.

What is claimed is:

1. A deep neural network-based real-time inference apparatus including a cloud server configured to infer an acquired image along with an edge device in a split manner, the apparatus comprising:
    a memory configured to store information of a second artificial intelligence model identical to a first artificial intelligence model of the edge device; and
    a processor executing one or more instructions stored in the memory, wherein the instructions, when executed by the processor, cause the processor to receive a quantized feature of an output of a first layer corresponding to a predetermined split point among a plurality of layers included in the first artificial intelligence model, and determine a processing result for the image based on the second artificial intelligence model by inputting the quantized feature to a second layer of the second artificial intelligence model corresponding a layer immediately after the first layer.

2. The deep neural network-based real-time inference apparatus of claim 1, wherein the cloud server determines an object in the image by inputting the quantized feature to the artificial intelligence model.

3. The deep neural network-based real-time inference apparatus of claim 1, wherein the first artificial intelligence model and the second artificial intelligence model include a deep neural network trained both with quantized and non-quantized features for each predetermined split layer.

4. The deep neural network-based real-time inference apparatus of claim 1, wherein the processor is configured to analyze at least one of a network resource between the edge device and the cloud server, a computing resource of the edge device, and a computing resource of the cloud server, and determine a location of the split point with respect to the first layer based on an analysis result.

5. The deep neural network-based real-time inference apparatus of claim 1, wherein the first artificial intelligence model and the second artificial intelligence model further include a quantization switch for switching between a path for quantizing a feature of each layer and a path for passing the feature of each layer without being quantized, and
    wherein the quantization switch is provided for each layer of the artificial intelligence models.

6. The deep neural network-based real-time inference apparatus of claim 1, wherein the first artificial intelligence model and the second artificial intelligence model dynamically apply a feature distribution matching unit that normalizes a distribution of features output from the first layer immediately after the split point through mean and variance.

7. The deep neural network-based real-time inference apparatus of claim 6, wherein the feature distribution matching unit applies a convolution layer for restoring feature precision to the quantized feature.

8. A deep neural network-based real-time inference apparatus including an edge device configured to transmit a quantized feature obtained by processing an acquired image to a cloud server, the apparatus comprising:
    a memory configured to store information of a first artificial intelligence model identical to a second artificial intelligence model of the cloud server; and
    a processor executing one or more instructions stored in the memory, wherein the instructions, when executed by the processor, cause the processor to analyze at least one of resources, select a first layer corresponding to a predetermined split point from among a plurality of layers included in the first artificial intelligence model according to the at least one of resources, quantize only a feature of the first layer, and transmit the quantized feature to the cloud server.

9. The deep neural network-based real-time inference apparatus of claim 8, wherein the cloud server determines a processing result for the image based on the second artificial intelligence model by inputting the quantized feature to a second layer of the second artificial intelligence model corresponding to a layer immediately after the first layer.

10. The deep neural network-based real-time inference apparatus of claim 8, wherein the first artificial intelligence model and the second artificial intelligence model includes a deep neural network trained both with quantized and non-quantized features for each predetermined split layer.

11. The deep neural network-based real-time inference apparatus of claim 8, wherein the at least one of resources includes a network resource between the edge device and the cloud server, a computing resource of the edge device, and a computing resource of the cloud server.

12. The deep neural network-based real-time inference apparatus of claim 8, wherein the first artificial intelligence model and the second artificial intelligence model further include a quantization switch for switching between a path for quantizing a feature of each layer and a path for passing the feature of each layer without being quantized, and
    wherein the quantization switch is provided for each layer of the artificial intelligence models.

13. The deep neural network-based real-time inference apparatus of claim 8, wherein the first artificial intelligence model and the second artificial intelligence model dynamically apply a feature distribution matching unit that normalizes a distribution of features output from the first layer immediately after the split point through mean and variance.

14. A deep neural network-based real-time inference method, the method comprising:
    acquiring, by a processor included in a cloud server, an image from an edge device;
    analyzing, by a processor included in the edge device, at least one of resources related to the edge device and a cloud server;
    selecting, by the processor included in the edge device, a first layer corresponding to a split point from among a plurality of layers included in a pre-trained first artificial intelligence model of the edge device according to the at least one of resources;
    quantizing, by the processor included in the edge device, only a feature of the first layer corresponding to the split point;
    transmitting, by the processor included in the edge device, the quantized feature to the cloud server;
    inputting, by the processor included in the cloud server, the quantized feature to a second layer corresponding to a layer immediately after the first layer among a plurality of layers included in a second artificial intelligence model identical to the first artificial intelligence model; and
    determining, by the processor included in the cloud server, a processing result for the image based on the second artificial intelligence model.

15. The deep neural network-based real-time inference method of claim 14, wherein the at least one of resources includes a network resource between the edge device and the cloud server, a computing resource of the edge device, and a computing of the cloud server.

16. The deep neural network-based real-time inference method of claim 15, wherein the first artificial intelligence model and the second artificial intelligence model further include a quantization switch for switching between a path for quantizing a feature of each layer and a path for passing the feature of each layer without being quantized, and wherein the quantization switch is provided for each split layer of the artificial intelligence models.

17. The deep neural network-based real-time inference method of claim 15, wherein the first artificial intelligence model and the second artificial intelligence model dynamically apply a feature distribution matching unit that normalizes a distribution of features output from the first layer immediately after the split point through mean and variance.

18. The deep neural network-based real-time inference method of claim 17, wherein the feature distribution matching unit applies a convolution layer for restoring feature precision to the quantized feature.

19. The deep neural network-based real-time inference method of claim 14, wherein the first artificial intelligence model and the second artificial intelligence model include a deep neural network trained both with quantized and non-quantized features for each predetermined split layer.

* * * * *